US008698994B2

(12) United States Patent
Park (10) Patent No.: US 8,698,994 B2
(45) Date of Patent: Apr. 15, 2014

(54) LIQUID CRYSTAL DISPLAY DEVICE INCLUDING ANTI-CORROSION LAYER

(75) Inventor: Kyungmin Park, Seongnam-si (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 135 days.

(21) Appl. No.: 13/302,967

(22) Filed: Nov. 22, 2011

(65) Prior Publication Data

US 2012/0133870 A1 May 31, 2012

(30) Foreign Application Priority Data

Nov. 22, 2010 (KR) .................. 10-2010-0116339

(51) Int. Cl.
*G02F 1/1339* (2006.01)
*G02F 1/1333* (2006.01)

(52) U.S. Cl.
USPC ............ 349/153; 349/190; 349/158; 349/138

(58) Field of Classification Search
USPC ................. 349/153, 190, 158, 138
See application file for complete search history.

(56) References Cited

U.S. PATENT DOCUMENTS

| 6,795,226 B2* | 9/2004 | Agrawal et al. ............... 359/265 |
| 6,882,399 B2* | 4/2005 | Park .............................. 349/153 |
| 7,156,942 B2* | 1/2007 | McCormick et al. .......... 156/249 |
| 8,378,983 B2* | 2/2013 | Nozawa et al. ............... 345/173 |
| 2002/0149320 A1 | 10/2002 | Maruyama et al. |
| 2005/0184652 A1 | 8/2005 | Maruyama et al. |

FOREIGN PATENT DOCUMENTS

| JP | 2002-305076 | 10/2002 |
| JP | 2009-076480 | 4/2009 |
| KR | 10-2003-0035498 | 5/2003 |
| KR | 10-2009-0088575 | 8/2009 |

* cited by examiner

*Primary Examiner* — Mike Qi
(74) *Attorney, Agent, or Firm* — Robert E. Bushnell, Esq.

(57) ABSTRACT

A liquid crystal display device includes a first substrate, a second substrate, a first insulation layer, an anti-corrosion layer, a liquid crystal layer, and a seal pattern. The second substrate faces the first substrate, and includes a display area which displays an image, and a non-display area surrounding the display area. The first insulation layer is provided on the second substrate, and exposes a layer thereunder at an edge of the non-display area. The anti-corrosion layer is provided at an edge of the first insulation layer. The liquid crystal layer is disposed between the first and second substrates. The seal pattern is provided on the first insulation layer, and couples the first and second substrates.

19 Claims, 8 Drawing Sheets

LIQUID CRYSTAL DISPLAY DEVICE INCLUDING ANTI-CORROSION LAYER

CLAIM OF PRIORITY

This application makes reference to, incorporates the same herein, and claims all benefits accruing under 35 U.S.C. §119 from an application earlier filed in the Korean Intellectual Property Office on Nov. 22, 2010 and there duly assigned Serial No. 10-2010-0116339.

BACKGROUND OF THE INVENTION

1. Field of the Invention

An embodiment of the present invention relates to a liquid crystal display device (LCD), and more particularly, to a liquid crystal display device, which reduces corrosion of a gate driver portion.

2. Description of the Related Art

LCDs are image display devices using the optical anisotropic characteristic of liquid crystal. In an LCD, when light is irradiated on liquid crystals that have polarization properties when a voltage is applied to the liquid crystal, the amount of transmitted light is controlled through orientation state of liquid crystals with the application of voltage. With this principle, therefore, an image is displayed by the LCD.

SUMMARY OF THE INVENTION

An aspect of the present invention provides a liquid crystal display device, which reduces corrosion of a gate driver portion.

Embodiments of the present invention provide a liquid crystal display device including a first substrate; a second substrate facing the first substrate, and the second substrate including a display area which displays an image and a non-display area surrounding the display area; a first insulation layer provided on the second substrate, and exposing a layer which is disposed under the first insulation layer at an edge of the non-display area; an anti-corrosion layer provided at an edge of the first insulation layer; a liquid crystal layer disposed between the first and second substrates; and a seal pattern provided on the first insulation layer, and coupling the first and second substrates.

In some embodiments, the liquid crystal display device may further include a thin film transistor provided in the display area of the second substrate, and the thin film transistor including a gate electrode, a gate dielectric, a semiconductor layer, a source electrode and a drain electrode.

In other embodiments, the liquid crystal display device may further include a pixel electrode provided on the first insulation layer, and the pixel electrode being electrically connected to the drain electrode.

In still other embodiments, the anti-corrosion layer may be formed of the same material as the pixel electrode.

In even other embodiments, the anti-corrosion layer may be formed of indium tin oxide (ITO).

In yet other embodiments, the liquid crystal display device may further include a second insulation layer provided between the thin film transistor and the first insulation layer.

In further embodiments, the first insulation layer may expose the second insulation layer.

In still further embodiments, the anti-corrosion layer may be extended onto the exposed second insulation layer.

In even further embodiments, the gate dielectric may be extended between the second substrate and second insulation layer in the non-display area.

In yet further embodiments, a stacked layer of the first and second insulation layers may expose the gate dielectric.

In yet further embodiments, the anti-corrosion layer may be extended onto the exposed gate dielectric.

In much further embodiments, a stacked layer of the first and second insulation layers and gate dielectric may expose the second substrate.

In still much further embodiments, the anti-corrosion layer may be extended onto the exposed second substrate.

In even much further embodiments, the first insulation layer may be formed of an organic material.

In yet much further embodiments, the liquid crystal display device may further include a color filter layer provided on the first substrate; and a common electrode provided on the first substrate.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. In the drawings, therefore, the shapes and sizes of elements may be exaggerated for clarity. Moreover, like reference numerals refer to like elements throughout.

A LCD may include a thin film transistor substrate on which a thin film transistor and a pixel electrode are provided, a color filter substrate on which a color filter and a common electrode are provided, and a liquid crystal layer that is disposed between the thin film transistor substrate and the color filter substrate.

Figure 1:
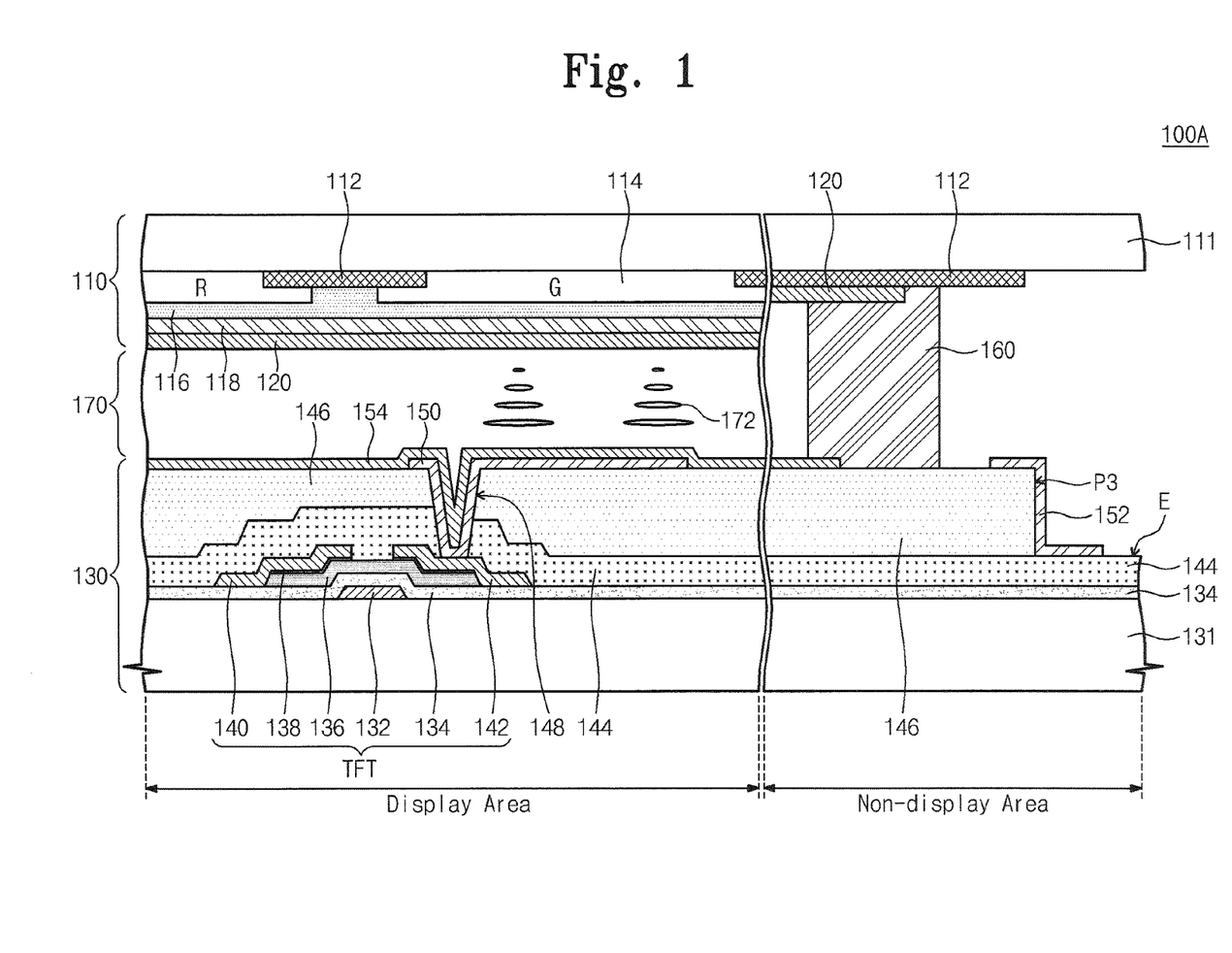
FIG. 1 is a partial cross-sectional view illustrating a liquid crystal display device constructed as a first embodiment of the present invention.

FIG. 1 is a cross-sectional view illustrating a liquid crystal display device constructed as a first embodiment of the present invention.

Referring to FIG. 1, a liquid crystal display device 100A constructed as a first embodiment of the inventive concept may include a color filter substrate 110, a thin film transistor substrate 130, and a liquid crystal layer 170 that is disposed between the color filter substrate 110 and the thin film transistor substrate 130.

A first substrate 111 of the color filter substrate 110 may be formed of a transparent glass. Black Matrixes (BM) 112, that are separated at certain distances and patterned, may be provided under the first substrate 111. To prevent leakage of external light and scattered light, the black matrixes 112 may be provided in an area corresponding to a thin film transistor (TFT), gate line (not shown) and data line (not shown) of the thin film transistor substrate 130. Also, the black matrixes 112 may be respectively provided in boundary portions between the color filters (i.e., different color filters, for example, G (green), R (red) and B (blue)) of a color filter layer 114, thereby preventing color mixture between the different color filters. The black matrixes 112 may be formed of a metal, for example, chromium (Cr), CrOx, or a double layer thereof.

The red R, green G and blue B color filters of the color filter layer 114 that transmit only light of a specific wavelength, may be provided between the black matrixes 112, respectively. The color filter layer 114 may include an acrylic resin corresponding to a main component, and dyes. The color filter layer 114 may be divided into red R, green G and blue B based on the kinds of dyes for realizing colors.

An overcoat layer 116 may be additionally provided under the black matrixes 112 and the color filter layer 114. The overcoat layer 116 may be provided for protection and surface planarization of the color filter layer 114 and enhancement of adhesive strength to a common electrode 118, and may be formed of an acrylic-based resin or a polymer-based resin.

The common electrode 118 may be provided under the overcoat layer 116. The common electrode 118 may be formed of a transparent conductive material, for example, indium tin oxide (ITO) or indium zinc oxide (IZO). An upper alignment layer 120 may be additionally provided under the common electrode 118 in order for liquid crystal molecules to easily be aligned.

Although not shown, a spacer (not shown) that maintains a certain cell gap between the color filter substrate 110 and the thin film transistor substrate 130 may be provided on the color filter substrate 110. The spacer may be formed of a resin from among organic polymer materials.

A second substrate 131 of the thin film transistor substrate 130 may include a display area for displaying an image and a non-display area surrounding the display area, and the second substrate 131 may be formed of a transparent glass. The display area displays the image and the non-display area does not display the image. A thin film transistor TFT, which includes a gate electrode 132, a gate dielectric 134, a semiconductor layer 136, an ohmic contact layer 138, a source electrode 140 and a drain electrode 142, may be formed in the display area on the second substrate 131. The thin film transistor TFT is a switching device for applying a signal to liquid crystal or for discontinuing the signal.

Specifically, the gate electrode 132 may be formed of a conductive material such as a metal. For example, the gate electrode 132 may be formed of one that is selected from the group consisting of aluminum (Al), aluminum alloy (AlNd), tungsten (W), chromium (Cr), titanium (Ti) and molybdenum (Mo).

The gate dielectric 134 is provided on the gate electrode 132, and is extended onto the second substrate 131 of the non-display area. The gate dielectric 134 may be formed of silicon dioxide ($SiO_2$). The semiconductor layer 136 may be provided on the gate dielectric 134 corresponding to the gate electrode 132, and may be formed of pure amorphous silicon (a-Si:H). The ohmic contact layer 138 may be provided on the semiconductor layer 136, and may be formed of amorphous silicon (a-Si:H) with injected impurities. The ohmic contact layer 138 may be formed on the semiconductor layer 136 in order for a portion of the surface of the semiconductor layer 136 to be exposed.

The source electrode 140 and the drain electrode 142 are separated from each other and provided on the ohmic contact layer 138. The source electrode 140 and the drain electrode 142 may be formed of one or more selected from the group consisting of Mo, Ti, W, tungsten molybdenum (MoW), Cr, nickel (Ni), Al and AlNd. A channel (not shown) that electrically connects the source electrode 140 and the drain electrode 142 is formed in a separated portion between the source electrode 140 and the drain electrode 142, where a portion of the surface of the semiconductor layer 136 is exposed.

Therefore, when a high-level voltage is applied to the gate electrode 132, and a data voltage is applied to the source electrode 140, a current flows through the semiconductor layer 136, and thus the data voltage applied to the source electrode 140 is supplied to the drain electrode 142 through the semiconductor layer 136.

Although not shown, a gate line connected to the gate electrode 132 is provided in a first direction, and a data line connected to the source electrode 140 is provided in a second direction intersecting the first direction. Herein, an area in which the gate line intersects the data line is defined as a pixel area.

A first insulation layer 144 may be provided on the thin film transistor TFT, for protecting the thin film transistor TFT and preventing the non-filling of a second insulation layer 146. The first insulation layer 144 may be extended onto the gate dielectric 134 of the non-display area. The first insulation layer 144 may be formed of $SiO_2$ or SiNx, or a double-layer thereof.

The second insulation layer 146 may be provided on the first insulation layer 144, for reducing a parasitic capacitance value between the gate line (not shown) and the pixel electrode 150. The second insulation layer 146 may be formed of an organic material, for example, a material having a low permittivity such as acrylic resin or benzocyclobutene (BCB).

The second insulation layer 146 may be extended onto the first insulation layer 144 of the non-display area, and may have an opening O (see FIG. 2E) that exposes the first insulation layer 144 thereunder at the edge E of the non-display area.

A contact hole 148 exposing a portion of the surface of the drain electrode 142 may be provided in the first and second insulation layers 144 and 146, in the display area. A pixel electrode 150 that is electrically connected to the drain electrode 142 through the contact hole 148 may be provided on the second insulation layer 146 of the display area. The pixel electrode 150 may be provided in an area corresponding to the color filter layer 114. The pixel electrode 150 may be formed of a transparent conductive material. For example, the pixel electrode 150 may be formed of ITO.

An anti-corrosion layer 152 may be provided at the edge of the second insulation layer 146, in the non-display area. In this case, the anti-corrosion layer 152 may be extended onto the exposed portion of the first insulation layer 144. In one embodiment, the anti-corrosion layer 152 may be extended directly onto the exposed portion of the first insulation layer 144. The anti-corrosion layer 152 may be formed of the same material as that of the pixel electrode 150. For example, the anti-corrosion layer 152 may be formed of ITO. In one embodiment, the anti-corrosion layer 152 may cover the periphery P3 of the second insulation layer 146.

The anti-corrosion layer 152 prevents detachment between the first and second insulation layers 144 and 146 when a cell is cut and then separated, and thus preventing moisture from penetrating through an interface between the first and second insulation layers 144 and 146.

A lower alignment layer 154 may be additionally provided on the pixel electrode 150 and the second insulation layer 146 in order for liquid crystal molecules to easily be aligned.

The color filter substrate 110 and the thin film transistor substrate 130 are coupled by a seal pattern 160, in the non-display area. The seal pattern 160 may be separated from the anti-corrosion layer 152 and be provided on the second insulation layer 146. The seal pattern 160 connects the second insulation layer 146 and the black matrix 112. In this case, the seal pattern 160 may partially overlap with the upper alignment layer 120 and the lower alignment layer 154 due to the process margins for the upper and lower alignment layers 120 and 154. The seal pattern 160 may be formed of a sealant, for example, which may be an optical hardening epoxy resin or a thermal hardening epoxy resin.

A liquid crystal layer 170 may be provided in an area where a certain cell gap between the color filter substrate 110 and the thin film transistor substrate 130 is formed. The liquid crystal layer 170 may include liquid crystal molecules 172 having optical anisotropic characteristics.

The liquid crystal display device 100A drives a liquid crystal cell by applying a voltage to the pixel electrode 150 through the drain electrode 142 and applying a voltage to the common electrode 118, thereby displaying an image.

According to a first embodiment of the present invention, the anti-corrosion layer 152 is formed in the edge of the second insulation layer 146 in the non-display area, and thus detachment between the first and second insulation layers 144 and 146 is prevented when a cell is cut and then separated. Therefore, moisture may be prevented from penetrating through the interface between the first and second insulation layers 144 and 146, and thus the corrosion of a gate driver portion may be reduced. Accordingly, reliability of the liquid crystal display device 100A may be enhanced.

FIGS. 2A through 2G are cross-sectional views illustrating a method of manufacturing a thin film transistor substrate of a liquid crystal display device, according to the first embodiment of the present invention. Hereinafter, a method of manufacturing a thin film transistor substrate of a liquid crystal display device according to a first embodiment of the inventive concept will be described in brief with reference to the accompanying drawings.

Figure 2A:
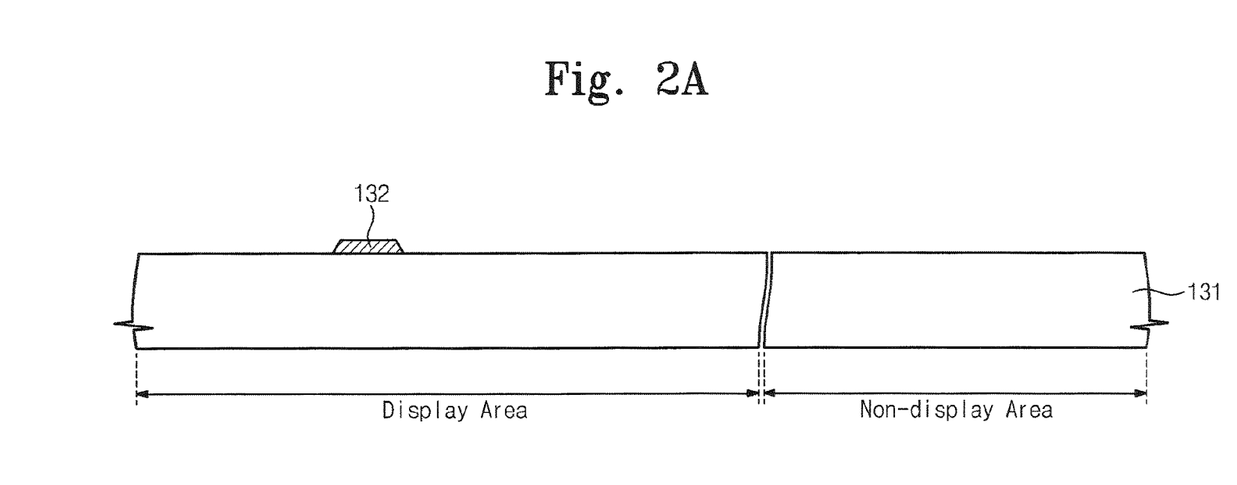
FIGS. 2A through 2G are partial cross-sectional views illustrating a method of manufacturing a thin film transistor substrate of a liquid crystal display device, constructed as the first embodiment of the present invention.

Referring to FIG. 2A, a second substrate 131 is prepared, including a display area for displaying an image and a non-display area surrounding the display area. Subsequently, a conductive metal layer is formed by depositing a conductive metal on the second substrate 131 with a sputtering method or an evaporation method. By patterning the conductive metal layer with a mask, a gate electrode 132 is formed in the display area. Herein, the mask may be a photoresist pattern that is formed through a photolithography process. This is a known technology, and description thereof will thus be omitted. Although not shown, a gate line or a date line may be formed when the gate electrode 132 is formed.

Figure 2B:
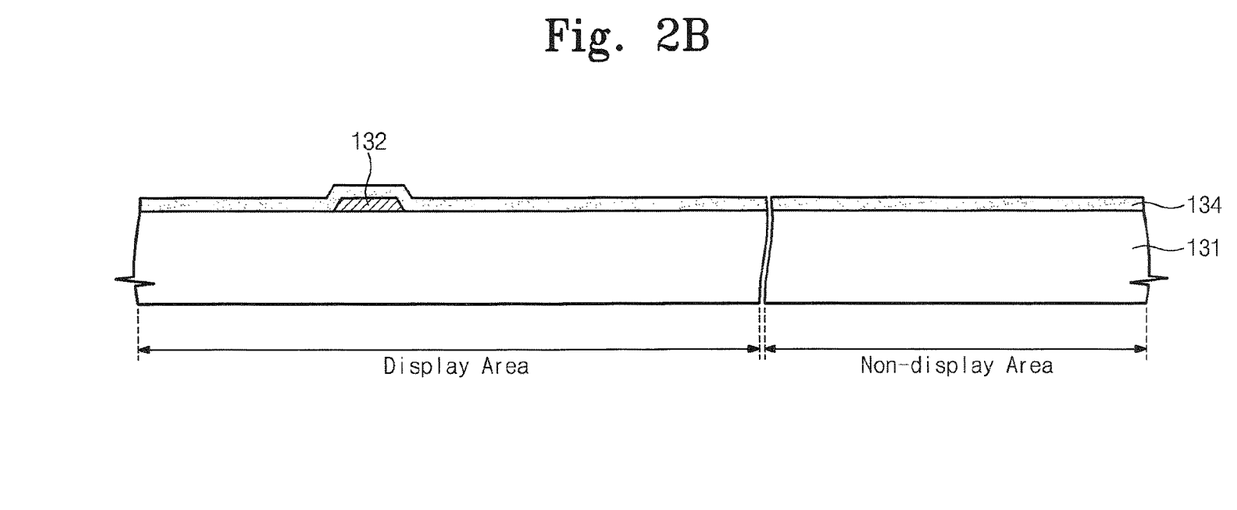

Referring to FIG. 2B, a gate dielectric 134 is formed on the gate electrode 132 and the second substrate 131. The gate dielectric 134 may be formed by depositing $SiO_2$ on the gate electrode 132 with a Chemical Vapor Deposition (CVD) method. Therefore, the gate dielectric 134 is formed on the entire top of the second substrate 131.

Figure 2C:
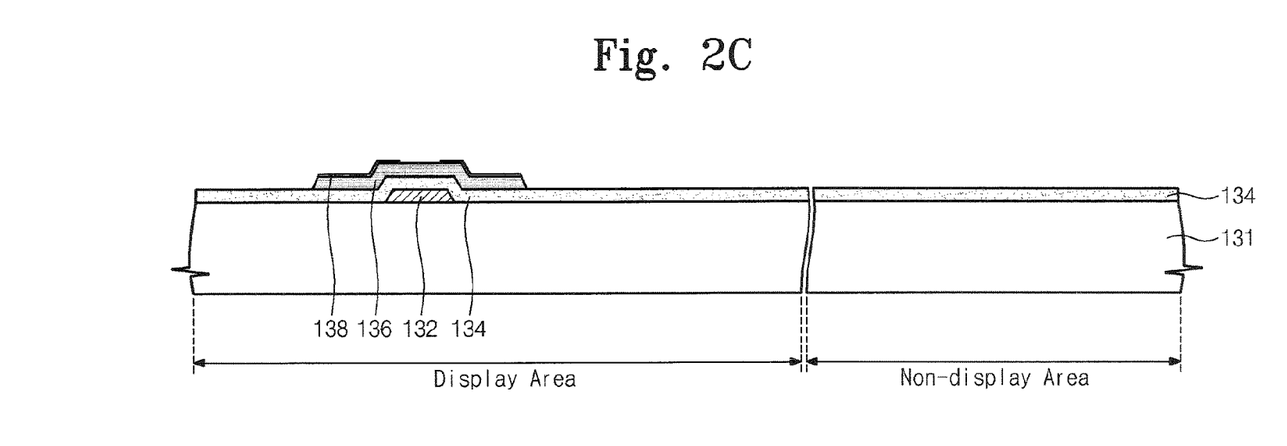

Referring to FIG. 2C, a semiconductor layer 136 and an ohmic contact layer 138 are sequentially formed on the gate dielectric 134 corresponding to the gate electrode 132, wherein the ohmic contact layer 138 is formed on the semiconductor layer 136 in order for a portion of the surface of the semiconductor layer 136 to be exposed. By sequentially depositing pure amorphous silicon and n-type or p-type impurity-injected amorphous silicon on the gate dielectric 132 with the CVD method and then patterning the deposited silicon with a mask, the semiconductor layer 136 and the ohmic contact layer 138 may be formed. Alternatively, the ohmic contact layer 138 may be omitted.

Figure 2D:
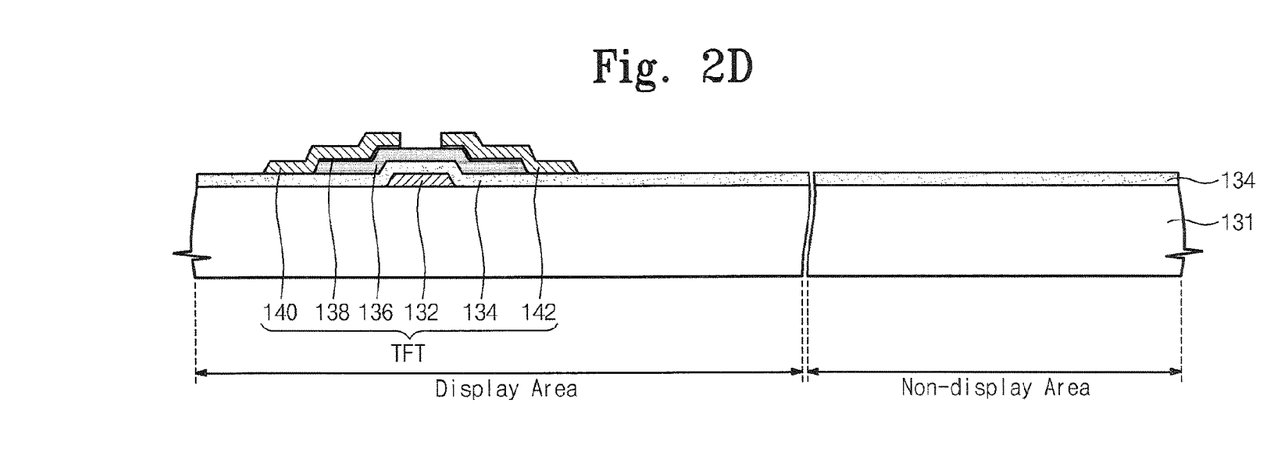

Referring to FIG. 2D, a source electrode 140 and a drain electrode 142 are formed separated from each other on the ohmic contact layer 138. A conductive metal may be deposited on the ohmic contact layer 138 and the gate dielectric 134 with a sputtering method or an evaporation method and then patterned with a mask to form the source electrode 140 and the drain electrode 142. In this case, an area where the semiconductor layer 136 is exposed between the source electrode 140 and the drain electrode 142 is provided as a channel.

A thin film transistor, which includes the gate electrode 132, the gate dielectric 134, the semiconductor layer 136, the ohmic contact layer 138, the source electrode 140 and the drain electrode 142, is thus completed in the display area on the second substrate 131.

Figure 2E:
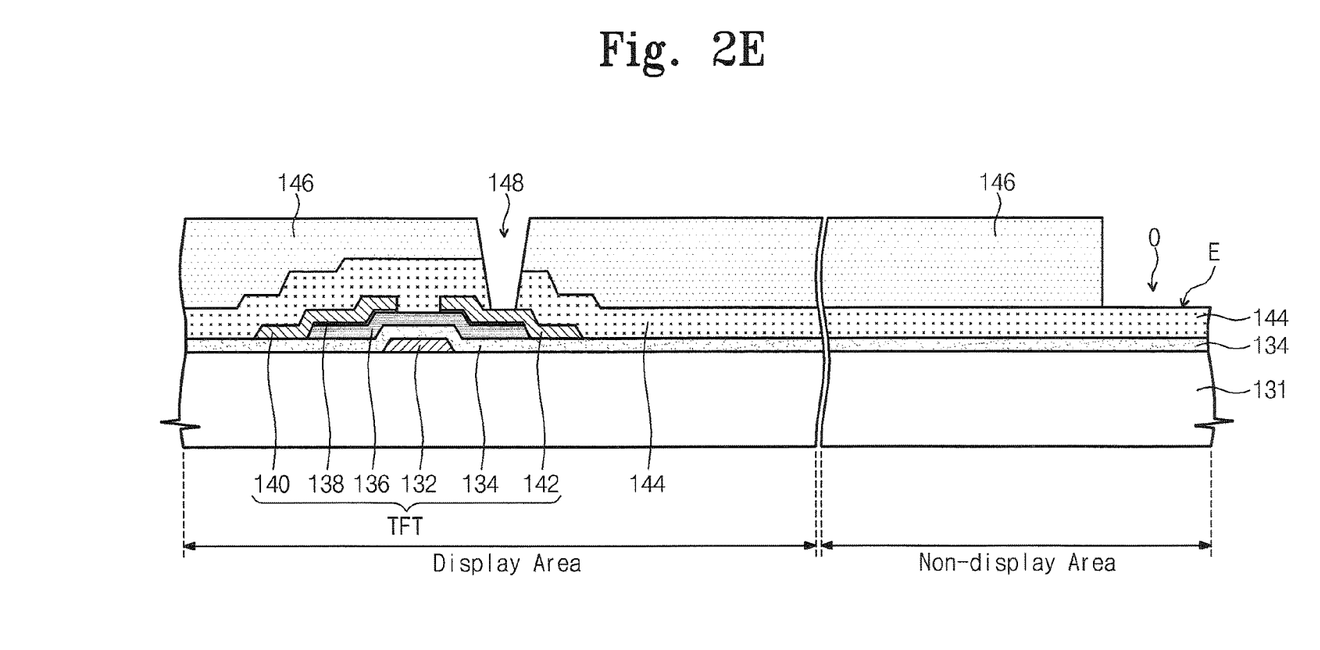

Referring to FIG. 2E, first and second insulation layers 144 and 146 are sequentially formed on the thin film transistor TFT and the gate dielectric 134. The first insulation layer 144 is a passivation layer for the thin film transistor TFT. $SiO2$, $SiNx$ or a double-layer thereof may be deposited on the thin film transistor TFT and the gate dielectric 134 with the CVD method to form the first insulation layer 144. The second insulation layer 146 may be formed by coating an organic material such as acrylic resin or BCB with a spin coating method. Therefore, the first and second insulation layers 144 and 146 are formed on the entire top of the gate dielectric 134.

Subsequently, a contact hole 148 exposing a portion of the surface of the drain electrode 142 is formed in the first and second insulation layers 144 and 146 through a patterning process using a mask. Also, when the contact hole 148 is formed, the edge of the second insulation layer 146 is etched with a mask in the non-display area. Therefore, the second insulation layer 146 has an opening O that exposes the first insulation layer 144 thereunder, at the edge E of the non-display area.

Figure 2F:
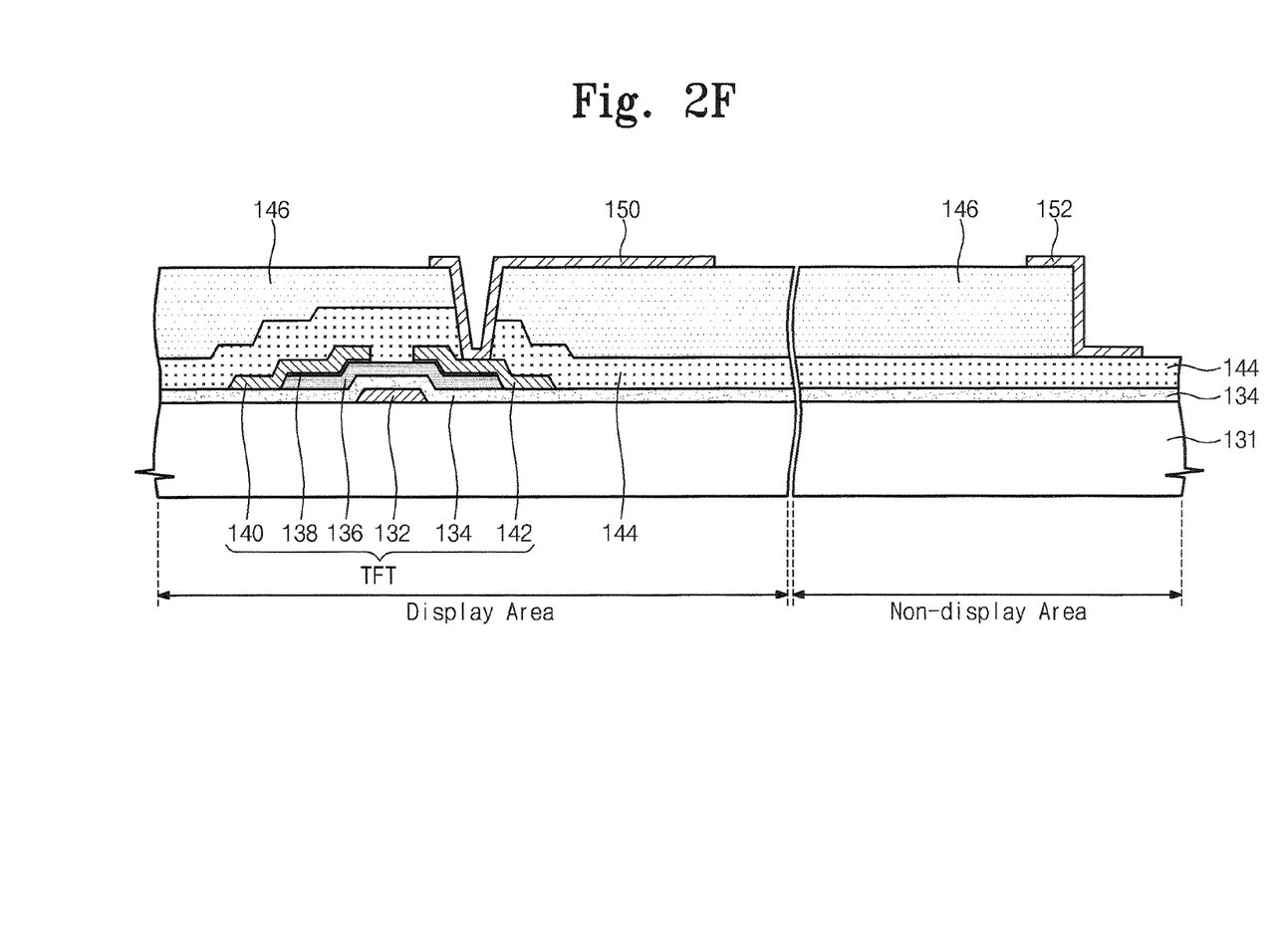

Referring to FIG. 2F, by depositing a transparent conductive material such as ITO on the second insulation layer 146 including the contact hole 148 with a sputtering method or an evaporation method and then patterning a transparent conductive material layer with a mask, a pixel electrode 150 that is electrically connected to the drain electrode 142 through the contact hole 148 is formed on the second insulation layer 146 in the display area, and an anti-corrosion layer 152 is formed at the edge of the second insulation layer 146 in the non-display area. In this case, the anti-corrosion layer 152 may be extended onto the exposed portion of the first insulation layer 144.

Figure 2G:
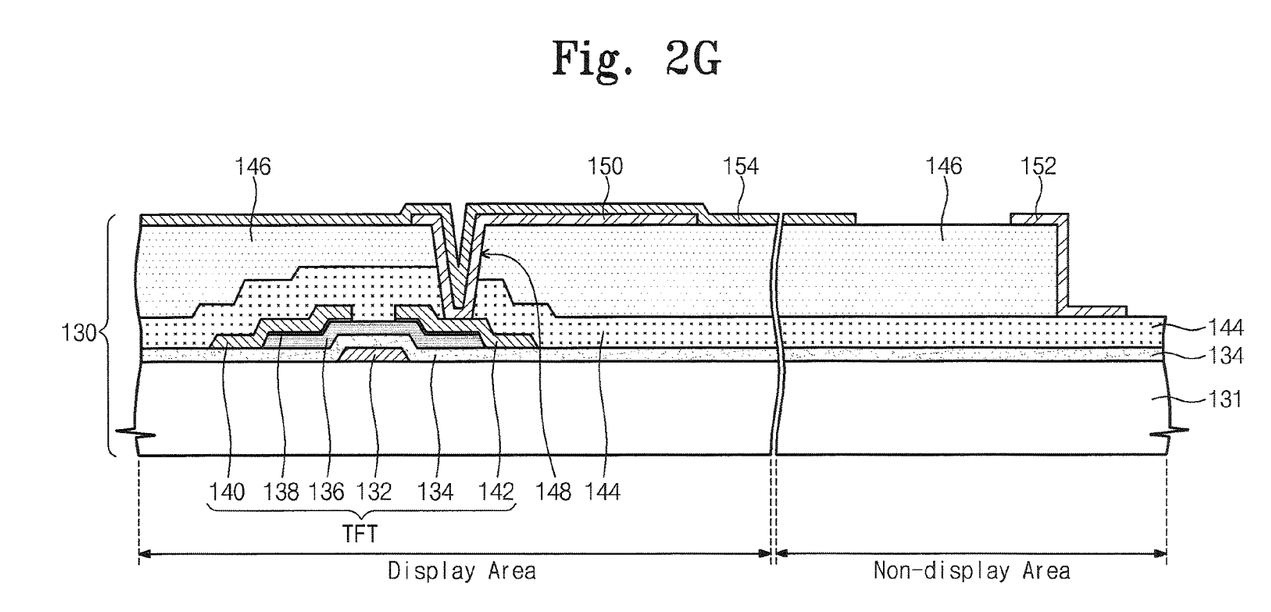

Referring to FIG. 2G, a lower alignment layer 154 is additionally formed by coating polyimide on the pixel electrode 150 and the second insulation layer 146 with a spinning method, a dipping method or a roller coating method. The lower alignment layer 154 may be formed to overlap with the seal pattern 160 (see FIG. 1) to prevent a decrease in adhesive strength to the seal pattern 160. Therefore, a thin film transistor substrate 130 is completed, wherein the thin film transistor substrate 130 includes the thin film transistor TFT and pixel electrode 150 in the display area and the anti-corrosion layer 152 that is provided at the edge of the second insulation layer 146 in the non-display area.

Figure 3:
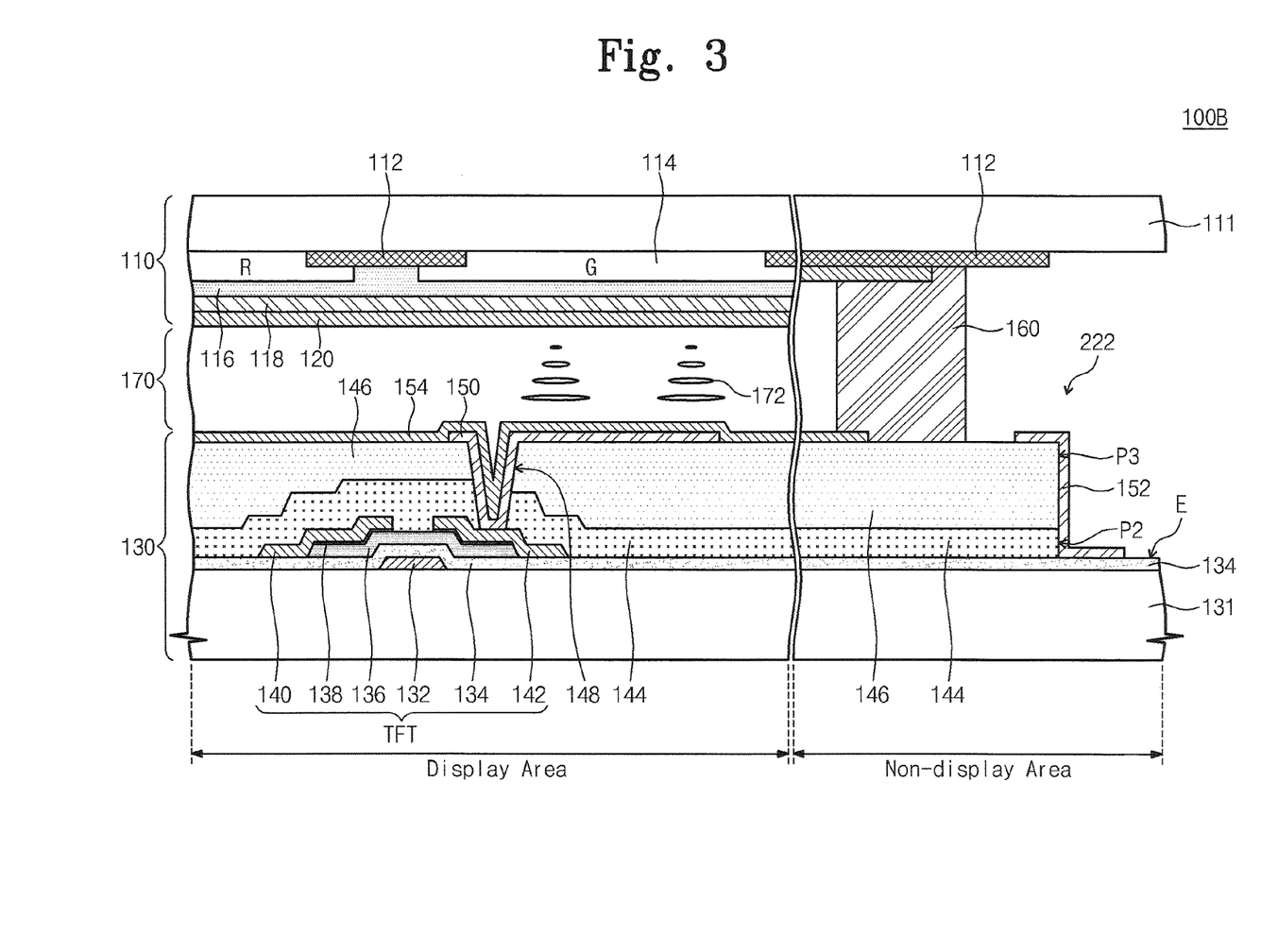
FIG. 3 is a cross-sectional view illustrating a liquid crystal display device constructed as a second embodiment of the present invention.

FIG. 3 is a cross-sectional view illustrating a liquid crystal display device constructed as a second embodiment of the present invention. Hereinafter, a liquid crystal display device constructed as the second embodiment of the present invention will be described with reference to FIGS. 3, 2E and 2F.

Referring to FIG. 3, a liquid crystal display device 100B constructed as the second embodiment of the present invention may have the same configuration as that of the liquid crystal display device 100A constructed as the first embodiment of the present invention, except that a gate dielectric 134 under a stacked layer of first and second insulation layers 144 and 146 is exposed at the edge E of a non-display area, and an anti-corrosion layer 152 is provided at the edges of the first and second insulation layers 144 and 146. In one embodiment, the anti-corrosion layer 152 may be provided at the peripheries P2 and P3 of the first and second insulation layers 144 and 146. Therefore, repetitive description of the same elements as those of the first embodiment of the inventive concept will not be provided.

Referring to FIG. 2E, the edge of the first insulation layer 144 is additionally etched in a process for etching the edge of the second insulation layer 146 in the non-display area with a mask to expose the gate dielectric 134 thereunder at the edge of the non-display area. Referring to FIG. 2F, a transparent conductive material such as ITO is deposited on the second insulation layer 146 including the contact hole 148 through a sputtering method or an evaporation method and then patterned with a mask to form the anti-corrosion layer 152 at the edges of the first and second insulation layers 144 and 146 in the non-display area. In this case, the anti-corrosion layer 152 may be extended onto the exposed portion of the gate dielectric 134. In one embodiment, the anti-corrosion layer 152 may be extended directly onto the exposed portion of the gate dielectric 134.

Figure 4:
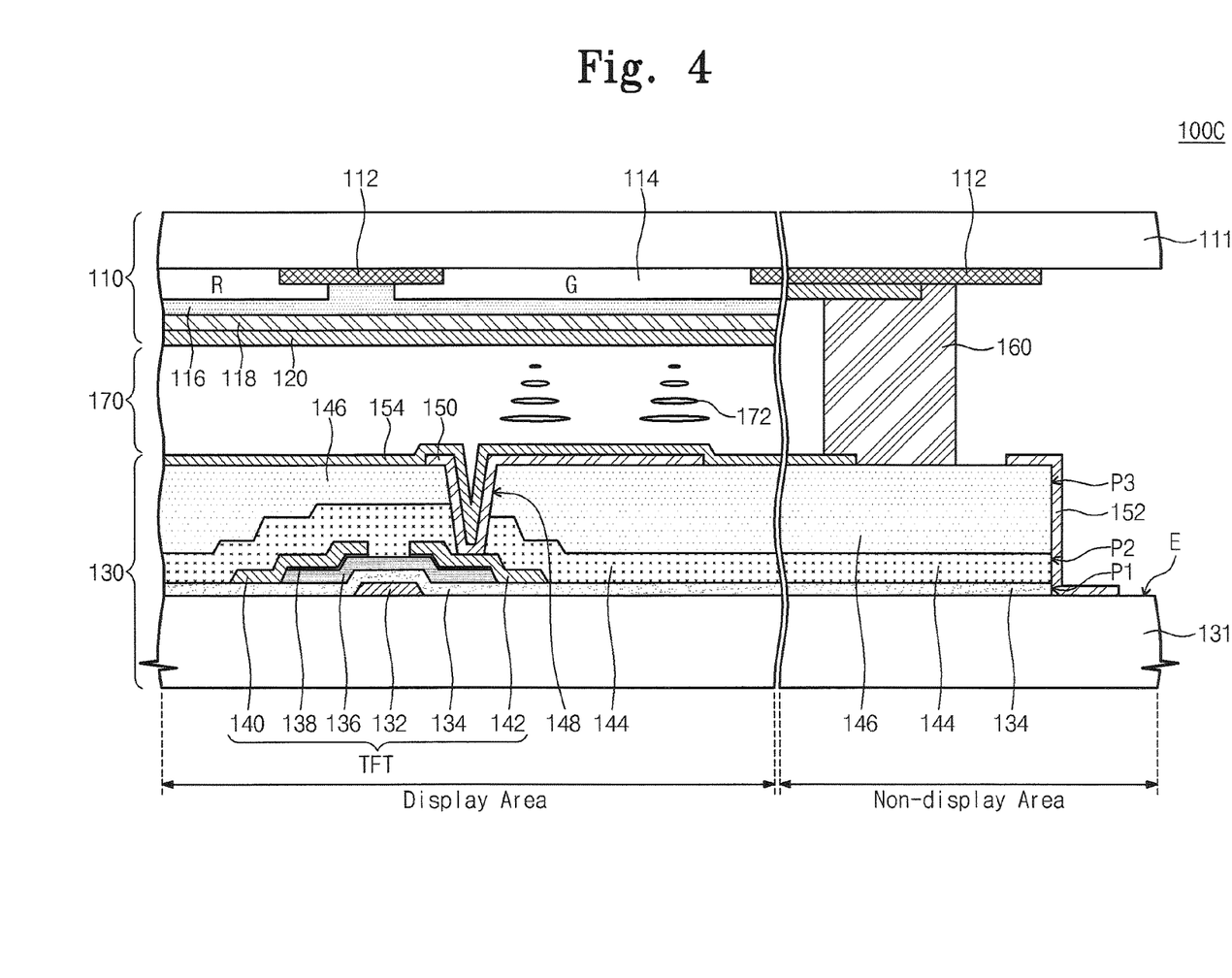
FIG. 4 is a cross-sectional view illustrating a liquid crystal display device constructed as a third embodiment of the present invention.

FIG. 4 is a cross-sectional view illustrating a liquid crystal display device constructed as a third embodiment of the present invention. Hereinafter, a liquid crystal display device constructed as the third embodiment of the present invention will be described with reference to FIGS. 4, 2E and 2F.

Referring to FIG. 4, a liquid crystal display device 100C constructed as the third embodiment of the present invention may have the same configuration as that of the liquid crystal display device 100A constructed as the first embodiment of the present invention, except that a second substrate 131 under a stacked layer of first and second insulation layers 144 and 146 and a gate dielectric 134 is exposed at the edge E of a non-display area, and an anti-corrosion layer 152 is provided at the edges of the first and second insulation layers 144 and 146 and gate dielectric 134 in the non-display area. In one embodiment, the anti-corrosion layer 152 may be provided at the peripheries P3, P2 and P1 of the second and first insulation layers 144 and 146 and gate dielectric 134. Therefore, repetitive description of the same elements as those of the first embodiment of the present invention will not be provided.

Referring to FIG. 2E, the edge of the first insulation layer 144 and the edge of the gate dielectric 134 are additionally etched in a process for etching the edge of the second insulation layer 146 with a mask to expose the gate dielectric 134 thereunder at the edge of the non-display area. Referring to FIG. 2F, a transparent conductive material such as ITO is deposited on the second insulation layer 146 including the contact hole 148 through a sputtering process or an evaporation process and then patterned with a mask to form the anti-corrosion layer 152 at the edges of the first and second insulation layers 144 and 146 and gate dielectric 134 in the non-display area. In this case, the anti-corrosion layer 152 may be extended onto the exposed portion of the second substrate 131. In one embodiment, the anti-corrosion layer 152 may be extended directly onto the exposed portion of the second substrate 131.

According to second and third embodiments of the present invention, the anti-corrosion layer 152 is formed at the edges of the first and second insulation layers 144 and 146 of the non-display area, or is formed at the edges of the first and second insulation layers 144 and 146 and gate dielectric 134 in the non-display area. Accordingly, the liquid crystal display devices constructed as the second and third embodiments of the inventive concept may also enhance reliability, as in the first embodiment of the present invention.

According to embodiments of the present invention, the anti-corrosion layer is formed in the edge of the insulation layer at the edge of the non-display area, and prevents the insulation layer from being detached from the layer thereunder when a cell is cut and then separated. Therefore, moisture is prevented from penetrating through the interface between the insulation layer and the layer thereunder, and thus corrosion of the gate driver portion is reduced. Accordingly, reliability of the liquid crystal display device may be enhanced.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A liquid crystal display device, comprising:
a first substrate;
a second substrate facing the first substrate, and the second substrate comprising a display area which displays an image and a non-display area surrounding the display area;
a second insulation layer provided on the second substrate, and the second insulation layer exposing a layer which is disposed under the second insulation layer at an edge of the non-display area;
an anti-corrosion layer provided at an edge of the second insulation layer;
a liquid crystal layer disposed between the first and second substrates; and
a seal pattern provided on the second insulation layer, and the seal pattern coupling the first and second substrates.

2. The liquid crystal display device of claim 1, further comprising: a thin film transistor provided in the display area of the second substrate, and the thin film transistor comprising a gate electrode, a gate dielectric, a semiconductor layer, a source electrode and a drain electrode.

3. The liquid crystal display device of claim 2, further comprising: a first insulation layer provided between the second insulation layer and the second substrate.

4. The liquid crystal display device of claim 3, wherein the second insulation layer exposes the first insulation layer.

5. The liquid crystal display device of claim 4, wherein the anti-corrosion layer is extended onto the exposed first insulation layer.

6. The liquid crystal display device of claim 3, wherein the gate dielectric is extended between the second substrate and first insulation layer in the non-display area.

7. The liquid crystal display device of claim 6, wherein a stacked layer of the first and second insulation layers exposes the gate dielectric.

8. The liquid crystal display device of claim 7, wherein the anti-corrosion layer is extended onto the exposed gate dielectric.

9. The liquid crystal display device of claim 6, wherein a stacked layer of the first and second insulation layers and gate dielectric exposes the second substrate.

10. The liquid crystal display device of claim 9, wherein the anti-corrosion layer is extended onto the exposed second substrate.

11. The liquid crystal display device of claim 2, further comprising: a pixel electrode provided on the second insulation layer, and the pixel electrode being electrically connected to the drain electrode.

12. The liquid crystal display device of claim 11, wherein the anti-corrosion layer is formed of the same material as the pixel electrode.

13. The liquid crystal display device of claim 12, wherein the anti-corrosion layer is formed of indium tin oxide (ITO).

14. The liquid crystal display device of claim 1, wherein the second insulation layer is formed of an organic material.

15. The liquid crystal display device of claim 1, further comprising:
a color filter layer provided on the first substrate; and
a common electrode provided on the first substrate.

16. A liquid crystal display device, comprising:
a first substrate;
a second substrate facing towards the first substrate, and the second substrate comprising a display area which displays an image and a non-display area surrounding the display area;
a second insulation layer provided on the second substrate, and the second insulation layer exposing a layer which is disposed under the second insulation layer at an edge of the non-display area;
an anti-corrosion layer provided to cover a periphery of the second insulation layer, to cover an upper surface of the first insulating layer and an upper surface of the exposed layer which is disposed under the second insulation layer;
a liquid crystal layer disposed between the first and second substrates; and
a seal pattern provided on the second insulation layer, and the seal pattern coupling the first and second substrates.

17. The liquid crystal display device of claim 16, with the exposed layer being a first insulation layer which is disposed between the second substrate and the second insulation layer.

18. The liquid crystal display device of claim 16, with the exposed layer being a gate electric of a thin film transistor which is disposed in the display area of the second substrate.

19. The liquid crystal display device of claim 16, with the exposed layer being the second substrate.

* * * * *